March 27, 1934.　　R. R. BLOSS ET AL　　1,952,410
CRANK COUNTERBALANCE
Filed June 15, 1931

INVENTORS.
Richard R. Bloss.
Roy C. Pfeil.
BY
Corbett & Mahoney
ATTORNEYS

Patented Mar. 27, 1934

1,952,410

UNITED STATES PATENT OFFICE 1,952,410

CRANK COUNTERBALANCE

Richard R. Bloss and Roy C. Pfeil, Columbus, Ohio, assignors to International-Stacey Corporation, Columbus, Ohio, a corporation of Ohio Application June 15, 1931, Serial No. 544,366

6 Claims. (Cl. 74—71)

Our invention relates to crank counterbalances for use in connection with oil, gas or artesian wells. It has to do, particularly, with the provision of a crank counterbalance that may be readily applied to a standard form of crank and may be disconnected and connected to the crank from time to time with a minimum of difficulty.

In the prior art, crank counterbalances have been used in connection with the pumping mechanism of an oil well or for similar purposes. However, in many cases, these crank counterbalances have been of such a nature as to require a specially constructed crank. Furthermore, the means for connecting the counterbalance weight structure to the crank has, in many cases, not been fully adequate to resist these stresses and strains to which such a connection is inevitably subjected.

One of the objects of our invention is to provide a crank counterbalance which may be readily connected to the crank of a pumping mechanism and which may be disconnected therefrom with equal readiness and adjusted to a position where it will be readily available and may be easily connected again to the crank. Another object of our invention is to provide a connecting mechanism which will clamp the counter weight firmly to the crank arm but in such spaced relation thereto that the mere removal of the clamping mechanism will leave the counter weight in such spaced relation to the crank arm that the crank arm may freely rotate without interference from the counter weight. Various other objects will appear as this description progresses.

In its preferred form, our invention preferably contemplates the provision of a counterbalance weight which is suspended from the crank shaft in between the crank arm and the jack post adjacent thereto. It is preferably mounted upon the crank shaft by means of a bushing which may be one of a series of bushings varying in internal diameter so that the counterbalance weight structure may be readily mounted upon any size crank shaft which may be found in the field. The counterbalance weight is preferably of segmental form and is provided with a pair of clamping members designed to grip the crank arm on opposite sides thereof and simultaneously maintain the crank arm and counterbalance weight rigidly connected together in spaced relation. The counterbalance weight structure further preferably comprises a plurality of sets of seats for the clamping units to facilitate the adjustment of the counterbalance weight so that it may be located either in centered relation to the crank arm or in lagging or leading position with relation thereto.

The preferred embodiment of our invention is shown in the accompanying drawing wherein similar characters of reference designate corresponding parts and wherein.

Figure 1:
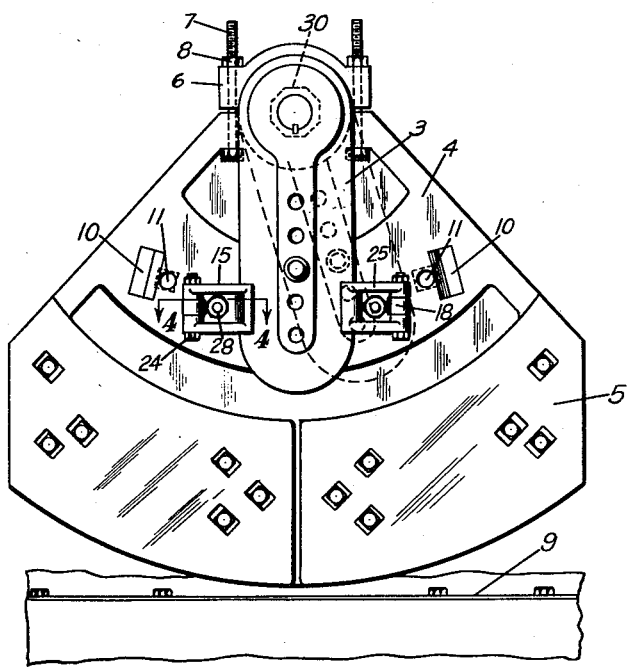
Figure 1 is an end elevation of a crank shaft and crank arm with our novel form of counterbalance weight associated therewith.
Figure 2:
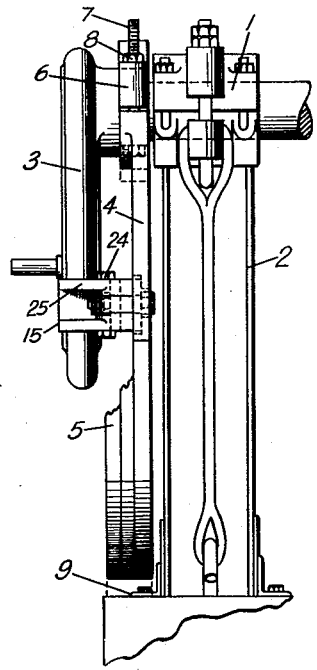
Figure 2 is a side elevation of the structure shown in Figure 1.

In the drawing, the crank shaft is shown at 1, with one end thereof supported by a jack post 2. The outer end of the shaft is provided with the usual crank arm 3 that may be mounted thereon in any suitable manner.

Disposed in between the crank arm and the jack post is the counterbalance weight structure which may be generally designated 4. This counterbalance weight structure is preferably of segmental form and may be provided with a series of detachable weight plates 5 which are of arcuate form and which are each of a length of about one-half the length of the lower arc of the weight structure.

At its upper end, the counterbalance weight structure may be provided with a split bearing embodying a cap 6. This cap 6 is preferably held in proper relation to the under half of the split bearing by means of bolts 7. These bolts 7 are of substantial length so that, by the adjustment of the nuts 8 thereon the counterbalance weight may, when disconnected from the crank arm, be lowered onto a supporting shelf 9 or may be raised from this supporting shelf by the adjustment of these nuts.

The counterbalance weight 4 is further provided upon its outer surface with series of recesses 10 and with adjacent bolt holes 11. The recesses 10 are preferably each provided with one wall perpendicular to their bases as at 12 and with an opposing wall inclined with relation thereto as at 13. These recesses may vary in number to any desired extent and they are designed to receive a heel of a toggle clamp.

Figures 3, 4:
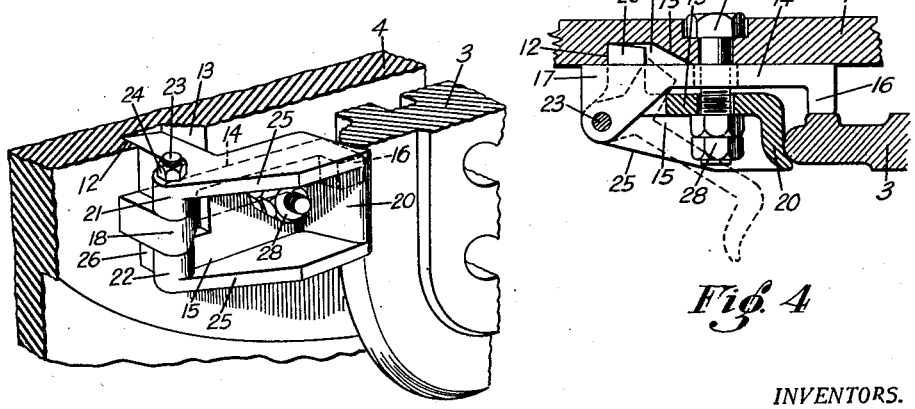
Figure 3 is a detailed view, in enlarged perspective, of one of the clamping units which we preferably utilize.
Figure 4 is a detail in section taken on line 4—4 of Figure 1.

The toggle clamps which we utilize are best illustrated in Figures 3 and 4 and they each comprise an inner member 14 and an outer member 15. The inner member 14 is substantially flat throughout the major portion of its length and is designed to lie in flat contact with the outer surface of the counter weight and across one of the recesses 10. At one end, it is provided with an outstanding leg 16 designed to bear against the inner surface of the crank arm and to definitely space the counterbalance weight from the crank arm.

The opposite end of the inner member 14 is reduced in width as at 17 and extends outwardly to form an apertured lug or boss 18. This apertured lug is designed to lie between the legs of a bifurcated end of the outer member 15 of the toggle clamp.

The outer member 15 of the toggle clamp preferably comprises a body portion 19 which normally lies in parallelism with the main body portion of the clamp 14. It is further provided with an out-turned hook-like flange 20 which overlies the outer corner of the crank arm 3 so that it may co-operate with the outstanding leg 16 of the member 14 for gripping the crank arm. The opposite end of the member 15 is bifurcated to provide spaced apertured lugs 21 and 22, whose apertures align with the aperture in the lug or boss 18 for the reception of a bolt 23 that may be held in place by a nut 24. This member 15 is further provided with reenforcing ribs 25. It is also provided with inwardly extending heels 26 which are designed to extend into the recesses 10 and abut the perpendicular walls 12 thereof.

These toggle clamps are normally drawn into operative position and held there by means of bolts 27 which fit with an adequate clearance in the bolt holes 11 in the counter weight. Suitable lock nuts 28 may be provided as desired.

As will be apparent from Figure 1 of the drawing, a pair of these toggle clamps is used for the connection of the counterbalance weight to the crank arm, one clamp being disposed on each side of the crank arm. When each toggle clamp is placed in position, the tightening of the bolt 27 forces the heels 26 of the outer member against the vertical wall 12 of the recess and draws the outer member of the clamp into clamping position with a toggle action. This toggle action ensures an extremely efficient clamping action. At the same time, the spacing leg 16 of the inner clamp member both braces the counter weight in spaced apart relation to the crank arm and co-operates with the outer clamp member to complete the rigid gripping action. Obviously, these clamps may be entirely removed from the recesses in which they are disposed by removing the lock nuts 28 and may then be moved as entities and positioned in other recesses to dispose the counterbalance weight in either lagging or leading relation to the crank arm.

In order to facilitate the application of our counterbalance weight to various size crank shafts, we preferably provide a stock of removable bushings 30. These bushings 30 are provided with varying internal diameters so that they may fit any size crank shaft, their outer diameters being the same so that they will snugly fit within the split bearing of the counterbalance weight and thereby render it readily applicable to any size crank shaft.

In cleaning out wells, it is desirable to have the crank arm move freely in a rotary path without the counterbalance weight. This may be accomplished by entirely removing the clamps, which leaves the counterbalance weight free of the crank arm with ample clearance to avoid interference. If desired, the crank shaft may be relieved of the weight of the counterbalance weight by adjusting the bolts 8 to lower the counterbalance weight upon the support 9. Then, whenever necessary, these nuts 8 may be again adjusted to lift the counterbalance weight from the support 9 and suspend it from the crank shaft. The toggle clamps may then be placed in position and the counterbalance weight connected by means of these clamps to the crank arm so that it will rotate therewith.

It will be apparent that we have provided an extremely simple type of crank counterbalance which is of such a structure and provided with such connecting means that it may be applied to any standard form of crank and may be applied to any size crank shaft. Furthermore, the clamping means utilized is of an extremely effective type and each clamp is removable as a unit and adjustable to any desired recess. It will be understood that the counterbalancing effect may be varied either by varying the number of weight members 5 or by varying the position of the wrist pin with relation to the center line of the crank shaft.

Having thus described our invention, what we claim is:

1. In combination with the crank shaft and crank arm of a pumping mechanism, a counter weight suspended from said crank shaft and disposed in juxtaposition to the crank arm, and a toggle clamp for clamping said counter weight to said crank arm.

2. A counterbalance weight structure comprising a body portion with a recess in one face thereof, a clamp for clamping said body portion to a crank arm, said clamp comprising a heel designed to lie in said recess, and a bolt for forcing said heel against one wall of said recess and the opposite end of the member which carries said heel into clamping relation to the crank arm.

3. In combination with the crank shaft and crank arm of a pumping mechanism, a counterbalance weight structure comprising a body portion suspended from said crank shaft and disposed in juxtaposition to said crank arm, and a toggle clamp structure for clamping said body portion to said crank arm, said toggle clamp structure being removable as a unit.

4. In combination with the crank shaft and crank arm of a pumping mechanism, a counterbalance weight structure comprising a body portion suspended from said crank shaft and disposed in juxtaposition to the crank arm, and a clamp for clamping the body portion of the counterbalance weight to said crank arm, said clamp comprising two members pivoted together.

5. In combination with the crank shaft and crank arm of a pumping mechanism, a counterbalance weight structure comprising a body portion suspended from said crank shaft and disposed in juxtaposition to said crank arm, a clamp for clamping said body portion to said crank arm, said clamp embodying opposing clamping jaws, one of said jaws being designed to lie in between the counterbalance weight and the crank arm to space the counterbalance weight therefrom.

6. In combination with the crank shaft and crank arm of a pumping mechanism, a counterbalance weight structure comprising a body portion suspended from said crank shaft and disposed in juxtaposition to said crank arm, said body portion of the counterbalance weight having a recess in one face thereof, a clamp for clamping said body portion to the crank arm, said clamp comprising a heel designed to lie in said recess, and means for drawing said clamp into clamping position.

RICHARD R. BLOSS.
ROY C. PFEIL.